(12) United States Patent
Liu et al.

(10) Patent No.: US 11,663,988 B2
(45) Date of Patent: May 30, 2023

(54) DISPLAY PANEL DRIVING METHOD, DRIVE CIRCUIT THEREOF, AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Yuanyuan Liu, Beijing (CN); Xuanxuan Qiao, Beijing (CN); Zhenzhou Xing, Beijing (CN); Xiaozhe Zhang, Beijing (CN); Jianjun Wang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/781,203

(22) PCT Filed: Feb. 9, 2021

(86) PCT No.: PCT/CN2021/076246
§ 371 (c)(1),
(2) Date: May 31, 2022

(87) PCT Pub. No.: WO2021/164650
PCT Pub. Date: Aug. 26, 2021

(65) Prior Publication Data
US 2023/0011905 A1 Jan. 12, 2023

(30) Foreign Application Priority Data

Feb. 21, 2020 (CN) .......................... 202010107440.2

(51) Int. Cl.
G09G 5/00 (2006.01)
G09G 3/36 (2006.01)
G06F 3/041 (2006.01)

(52) U.S. Cl.
CPC ......... *G09G 3/3674* (2013.01); *G06F 3/0412* (2013.01); *G09G 2310/0291* (2013.01); *G09G 2330/021* (2013.01); *G09G 2354/00* (2013.01)

(58) Field of Classification Search
CPC .... G09G 3/006; G09G 3/3674; G09G 3/3696; G09G 2310/0291; G09G 2320/0613; G09G 2330/021; G09G 2360/16
See application file for complete search history.

(56) References Cited

U.S. PATENT DOCUMENTS 9,275,572 B2 * 3/2016 Izawa .................. G09G 3/3208
9,711,106 B1 * 7/2017 Wang ..................... G09G 3/006
(Continued)

FOREIGN PATENT DOCUMENTS

CN          203787066 U    8/2014
CN          104952411 A    9/2015
(Continued)

OTHER PUBLICATIONS

CN202010107440.2 first office action.
(Continued)

*Primary Examiner* — Joe H Cheng
(74) *Attorney, Agent, or Firm* — IPro, PLLC (57) ABSTRACT

A display panel driving method, a drive circuit thereof, and a display device. The method comprises: when determined that the picture to be displayed belongs to a high power consumption display picture, providing a touch control and display integrated circuit and power supply management circuit of the display panel with a second reference voltage that is amplified by a first reference voltage and that is (Continued)

provided by an external voltage source, and driving each pixel to ensure the normal display of the high power consumption display picture; and when determined that the picture to be displayed belongs to a low power consumption display picture, directly providing the first reference voltage to the touch control and display integrated circuit and power supply management circuit of the display panel, and driving each pixel within the display panel so as to ensure the normal display of the low power consumption picture.

18 Claims, 6 Drawing Sheets

(56) References Cited

U.S. PATENT DOCUMENTS

| | | | | |
|---|---|---|---|---|
| 10,276,594 | B2* | 4/2019 | Yamazaki | H01L 29/78696 |
| 10,748,479 | B2* | 8/2020 | Kurokawa | H01L 27/0203 |
| 10,951,849 | B2* | 3/2021 | Liu | H04N 25/76 |
| 2008/0266216 | A1* | 10/2008 | Choi | G09G 3/3258 345/76 |
| 2012/0188221 | A1* | 7/2012 | Izawa | G09G 3/3283 345/212 |
| 2016/0334935 | A1 | 11/2016 | Jeon | |
| 2017/0206818 | A1 | 7/2017 | Wang et al. | |
| 2018/0158397 | A1 | 6/2018 | Nam et al. | |
| 2018/0359806 | A1 | 12/2018 | Li et al. | |
| 2021/0358352 | A1 | 11/2021 | Liu et al. | |
| 2022/0060343 | A1 | 2/2022 | Zhu et al. | |

FOREIGN PATENT DOCUMENTS

| | | |
|---|---|---|
| CN | 106062688 A | 10/2016 |
| CN | 205959592 U | 2/2017 |
| CN | 106484069 A | 3/2017 |
| CN | 107146592 A | 9/2017 |
| CN | 107657917 A | 2/2018 |
| CN | 109493796 A | 3/2019 |
| CN | 208986673 U | 6/2019 |
| CN | 110021258 A | 7/2019 |
| CN | 110323739 A | 10/2019 |
| CN | 110767195 A | 2/2020 |
| CN | 110782858 A | 2/2020 |
| CN | 111243540 A | 6/2020 |
| KR | 20090109610 A | 10/2009 |

OTHER PUBLICATIONS

CN202010107440.2 second office action.
CN202010107440.2 Decision of Rejection.
PCT/CN2021/076246 international search report.

* cited by examiner

Fig. 1

|   | R | G | B | R | G | B | R | G | B | R | G | B |
|---|---|---|---|---|---|---|---|---|---|---|---|---|
| L1 | — | — | — | — | — | — | — | — | — | — | — | — |
| L2 | — | — | — | — | — | — | — | — | — | — | — | — |
| L3 | — | — | — | — | — | — | — | — | — | — | — | — |
| L4 | — | — | — | — | — | — | — | — | — | — | — | — |
| L5 | — | — | — | — | — | — | — | — | — | — | — | — |
| L6 | — | — | — | — | — | — | — | — | — | — | — | — |
| L7 | — | — | — | — | — | — | — | — | — | — | — | — |
| L8 | — | — | — | — | — | — | — | — | — | — | — | — |
| L9 | — | — | — | — | — | — | — | — | — | — | — | — |
| L10 | — | — | — | — | — | — | — | — | — | — | — | — |
| L11 | — | — | — | — | — | — | — | — | — | — | — | — |
| L12 | — | — | — | — | — | — | — | — | — | — | — | — |
| L13 | — | — | — | — | — | — | — | — | — | — | — | — |
|   | S1 | S2 | S3 | S4 | S5 | S6 | S7 | S8 | S9 | S10 | S11 | S12 |

DISPLAY PANEL DRIVING METHOD, DRIVE CIRCUIT THEREOF, AND DISPLAY DEVICE

CROSS REFERENCE TO RELATED APPLICATIONS

The present disclosure is a National Stage of International Application No. PCT/CN2021/076246, filed on Feb. 9, 2021, which claims the priority of the Chinese patent application No. 202010107440.2 filed to the China National Intellectual Property Administration on Feb. 21, 2020, of which the entire contents are incorporated herein by reference.

FIELD

The present disclosure relates to the field of display technology, in particular to a display panel driving method, a drive circuit thereof, and a display device.

BACKGROUND

With development of a display technology, embedding a touch function into a liquid crystal display panel makes it possible to reduce a thickness and weight of the liquid crystal display panel, which has gradually become a mainstream direction of development.

For a touch control and display integration technology, an external voltage source may be used to provide a reference voltage for power supply, and the reference voltage is converted by a drive circuit to obtain a driving signal required for driving the display panel. However, when the liquid crystal display panel displays high power consumption images, due to insufficient loading capacity, the liquid crystal display panel may have a problem of a blank screen or an abnormal image.

SUMMARY

An embodiment of the present disclosure provides a display panel driving method, including: obtaining a data signal of an image to be displayed; determining whether the image to be displayed belongs to a high power consumption display image according to data parameters corresponding to the high power consumption display image set for a display panel and the data signal of the image to be displayed; in a condition that it is determined that the image to be displayed belongs to the high power consumption display image, amplifying a first reference voltage provided by an external voltage source into a second reference voltage, and providing the second reference voltage to a touch control and display integrated circuit of and a power supply management circuit of the display panel; and in a condition that it is determined that the image to be displayed belongs to a low power consumption display image, providing the first reference voltage to the touch control and display integrated circuit of and the power supply management circuit of the display panel.

In one possible implementation, in the display panel driving method provided by the embodiment of the present disclosure, the determining whether the image to be displayed belongs to the high power consumption display image according to the data parameters corresponding to the high power consumption display image set for the display panel and the data signal of the image to be displayed specifically includes: determining whether the data signal of the image to be displayed includes data parameters corresponding to the high power consumption display image according to the data parameters corresponding to the high power consumption display image and the data signal of the image to be displayed; determining whether a proportion of the data parameters corresponding to the high power consumption display image in the data signal of the image to be displayed is greater than a preset value in a condition that it is determined that the data signal of the image to be displayed includes the data parameters corresponding to the high power consumption display image; and determining that the image to be displayed belongs to the high power consumption display image in a condition that the proportion is greater than the preset value.

In one possible implementation, in the display panel driving method provided by the embodiment of the present disclosure, the determining whether the image to be displayed belongs to the high power consumption display image according to the data parameters corresponding to the high power consumption display image set for the display panel and the data signal of the image to be displayed further includes: determining that the image to be displayed belongs to the low power consumption display image in a condition that it is determined that the data signal of the image to be displayed does not include the data parameters corresponding to the high power consumption display image, or in a condition that it is determined that the proportion of the data parameters corresponding to the high power consumption display image in the data signal of the image to be displayed is smaller than the preset value.

In one possible implementation, in the display panel driving method provided by the embodiment of the present disclosure, the preset value is greater than 50%.

In one possible implementation, in the display panel driving method provided by the embodiment of the present disclosure, the method further includes: processing, by the power supply management circuit, the received first reference voltage or second reference voltage, and providing a processed voltage to the touch control and display integrated circuit and a gate driving circuit respectively.

In one possible implementation, in the display panel driving method provided by the embodiment of the present disclosure, the processing, by the power supply management circuit, the received first reference voltage or second reference voltage, and the providing the processed voltage to the touch control and display integrated circuit and the gate driving circuit respectively, includes: obtaining, by the power supply management circuit, a gate on-state voltage of the display panel, a gate off-state voltage of the display panel, a source and positive electrode analog voltage of the display panel and a source and negative electrode analog voltage of the display panel according to the received first reference voltage or the second reference voltage, providing the gate on-state voltage of the display panel and the gate off-state voltage of the display panel to the gate driving circuit, and providing the source and positive electrode analog voltage of the display panel and the source and negative electrode analog voltage of the display panel to the touch control and display integrated circuit.

In a second aspect, an embodiment of the present disclosure further provides a drive circuit of a display panel, including: a voltage processing circuit, an image detection circuit, a power supply management circuit, a touch control and display integrated circuit and a gate driving circuit.

The image detection circuit is configured to obtain a data signal of an image to be displayed, determine whether the image to be displayed belongs to a high power consumption display image according to data parameters corresponding to the high power consumption display image set for the display panel and the data signal of the image to be displayed, provide a first control signal to the voltage processing circuit in a condition that it is determined that the image to be displayed belongs to the high power consumption display image, and provide a second control signal to the voltage processing circuit in a condition that it is determined that the image to be displayed belongs to a low power consumption display image.

The voltage processing circuit is configured to receive a first reference voltage provided by an external voltage source, convert the first reference voltage to a second reference voltage and provide the second reference voltage to the power supply management circuit and the touch control and display integrated circuit in response to receiving the first control signal, and provide the first reference voltage to the power supply management circuit and the touch control and display integrated circuit in response to receiving the second control signal, wherein the second reference voltage is greater than the first reference voltage.

The power supply management circuit is configured to receive the first reference voltage or the second reference voltage provided by the voltage processing circuit, process the first reference voltage or the second reference voltage, and provide a processed voltage to the touch control and display integrated circuit and the gate driving circuit respectively.

In one possible implementation, in the drive circuit of the display panel provided by the embodiment of the present disclosure, the image detection circuit includes: a preset image detection sub-circuit and a display image determination sub-circuit; the preset image detection sub-circuit is configured to determine whether the data signal of the image to be displayed includes the data parameters corresponding to the high power consumption display image according to the data parameters corresponding to the high power consumption display image and the data signal of the image to be displayed; and the display image determination sub-circuit is configured to determine whether a proportion of data parameters corresponding to the high power consumption display image in the data signal of the image to be displayed is greater than a preset value in a condition that it is determined that the data signal of the image to be displayed includes the data parameters corresponding to the high power consumption display image, and determine that the image to be displayed belongs to the high power consumption display image in a condition that the proportion is greater than the preset value; and determine that the image to be displayed belongs to the low power consumption display image in a condition that it is determined that the data signal of the image to be displayed does not include the data parameters corresponding to the high power consumption display image, or in a condition that it is determined that the proportion of the data parameters corresponding to the high power consumption display image in the data signal of the image to be displayed is smaller than the preset value.

In one possible implementation, in the drive circuit of the display panel provided by the embodiment of the present disclosure, the preset value is greater than 50%.

In one possible implementation, in the drive circuit of the display panel provided by the embodiment of the present disclosure, the voltage processing circuit includes: a first switch control sub-circuit, a second switch control sub-circuit and an amplifying sub-circuit; an input of the first switch control sub-circuit is electrically connected to the external voltage source, and an output of the first switch control sub-circuit is electrically connected to the power supply management circuit and the touch control and display integrated circuit respectively; and the first switch control sub-circuit is configured to be turned off under control of the first control signal, and be turned on under control of the second control signal; an input of the second switch control sub-circuit is electrically connected to the external voltage source, an output of the second switch control sub-circuit is electrically connected to an input of the amplifying sub-circuit, and an output of the amplifying sub-circuit is electrically to the power supply management circuit and the touch control and display integrated circuit respectively; the second switch control sub-circuit is configured to be turned on under the control of the first control signal, and be turned off under the control of the second control signal; and the amplifying sub-circuit is configured to receive the first reference voltage in a condition that the second switch control sub-circuit is turned on, amplify the first reference voltage to obtain the second reference voltage, and provide the second reference voltage to the power supply management circuit and the touch control and display integrated circuit respectively.

In one possible implementation, in the drive circuit of the display panel provided by the embodiment of the present disclosure, the power supply management circuit includes: a first voltage conversion sub-circuit and a second voltage conversion sub-circuit; the first voltage conversion sub-circuit is configured to convert the first reference voltage or the second reference voltage, and provide an obtained source and positive electrode analog voltage of the display panel and an obtained source and negative electrode analog voltage of the display panel to the touch control and display integrated circuit; and the second voltage conversion sub-circuit is configured to convert the first reference voltage or the second reference voltage, and provide an obtained gate on-state voltage of the display panel and an obtained gate off-state voltage of the display panel to the gate driving circuit.

At a third aspect, an embodiment of the present disclosure further provides a display device, including the drive circuit provided by any embodiment of the second aspect, and a liquid crystal display panel electrically connected to the drive circuit.

DETAILED DESCRIPTION OF THE EMBODIMENTS

In an embedded display panel of the related art, a touch function is embedded in a liquid crystal display panel, thus a thickness of the display panel may be greatly reduced, and a touch control and display integrated circuit (Touch and Display Driver Integration, TDDI) may save cost of a drive circuit.

In a TDDI technology of the related art, there are two power supply schemes: one is that a power supply, such as VGH/VGL/AVDDP/AVDDN, required by the drive circuit is generated inside a main control TDDI chip because a power supply current generated by the chip is limited, this mode is only suitable for panels with small size and small resolution, that is, i.e., with small maximum power consumption.

The other is that the power supply required by the drive circuit is generated by an external power supply management circuit. A voltage and current generated by the power supply management circuit are greater than that generated in the TDDI chip, which is suitable for a liquid crystal display panel with large size and high resolution. For example, a 12.8 FHD (1920*1080) TDDI display panel adopts this power supply mode. The power supply supplied by an external voltage source to the display panel is usually only one power supply voltage VDD, so other voltages required by the drive circuit need to be converted through the voltage of VDD, and this conversion process is completed inside the power supply management circuit.

Figure 1:
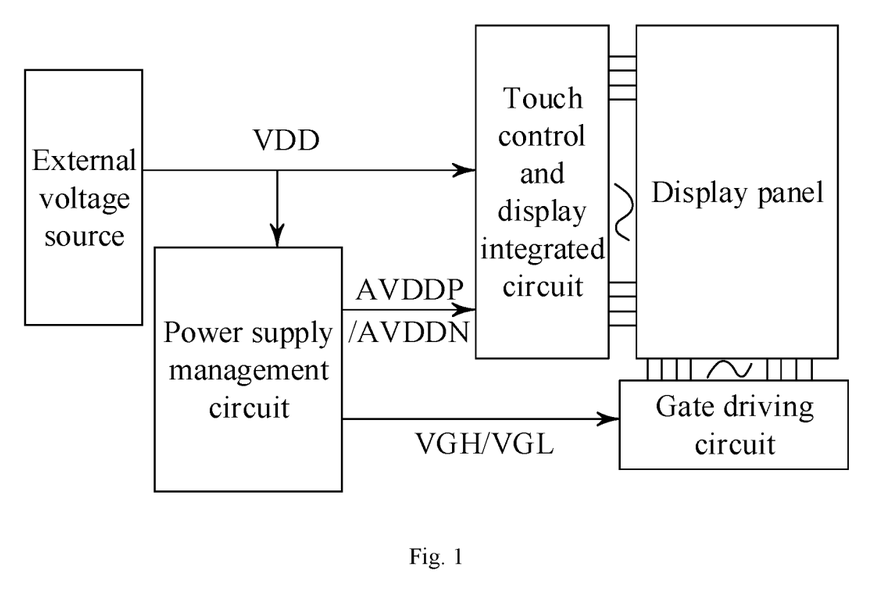
FIG. 1 is a schematic structural diagram of a drive circuit of a display panel in the related art.

As shown in FIG. 1, the drive circuit includes: a power supply management circuit, a touch control and display integrated circuit, and a gate driving circuit. The external voltage source provides a reference signal VDD to the power supply management circuit and the touch control and display integrated circuit respectively. The power supply management circuit converts the VDD signal into a gate on-state voltage VGH of a display panel, a gate off-state voltage VGL of the display panel, a source and positive electrode analog voltage AVDDP of the display panel, and a source and negative electrode analog voltage AVDDN of display panel, provides the VGH and VGL voltages to the gate driving circuit, and provides the AVDDP and AVDDN voltages to the touch control and display integrated circuit, so as to drive the display panel to work.

The touch control and display integrated circuit need to drive the display panel and a touch control panel at the same time. For the power supply voltage VDD, these two parts of the drive circuits are load circuits thereof. The load circuit has a larger load than an ordinary display panel, that is, theoretically, a load capacity of the power supply voltage should be stronger. However, since the external voltage source needs a more complex circuit to improve the load capacity of the power supply voltage, and meanwhile, cost of the external voltage source is also increased, in practical use, the load capacity of the external voltage source is usually insufficient. Therefore, a situation of a blank screen or an abnormal image of the display panel under a high power consumption image often occurs.

For the liquid crystal display panel, power consumption is related to an amplitude switching frequency and amplitude of a signal loaded on a data line. For a liquid crystal display panel with a normal structure, one data line controls one column of pixels, and the more pixels with different gray scales exist in the column of pixels, the greater the amplitude switching frequency of this data line. The larger the gray scale amplitude, the greater the driving force of the data line, and thus the greater the power consumption.

Figure 2:
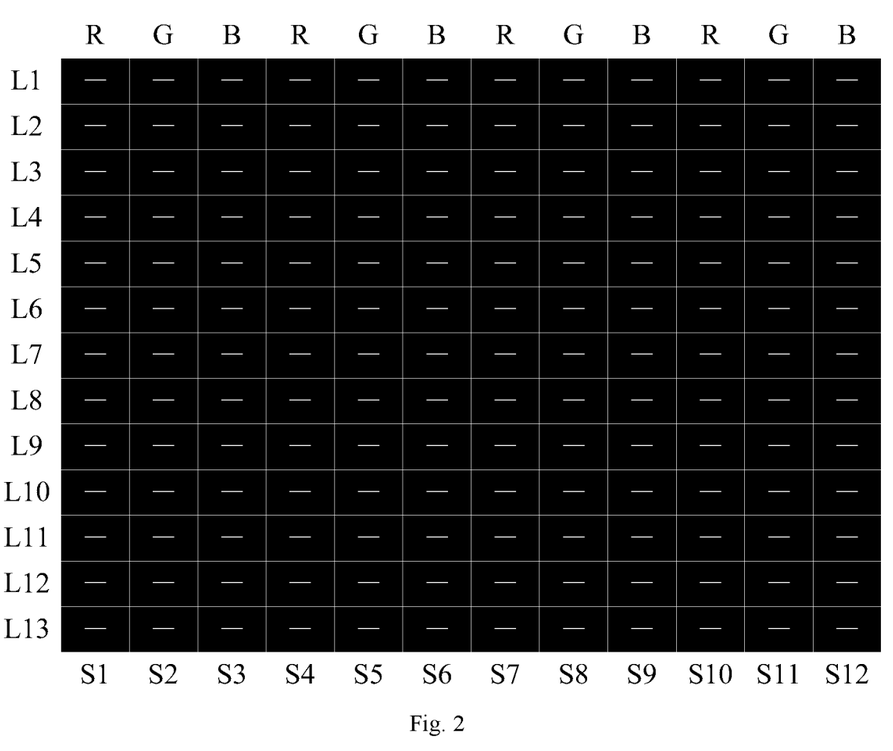
FIG. 2 is a schematic diagram of data parameters when a display panel displays a low power consumption image.
Figure 3:
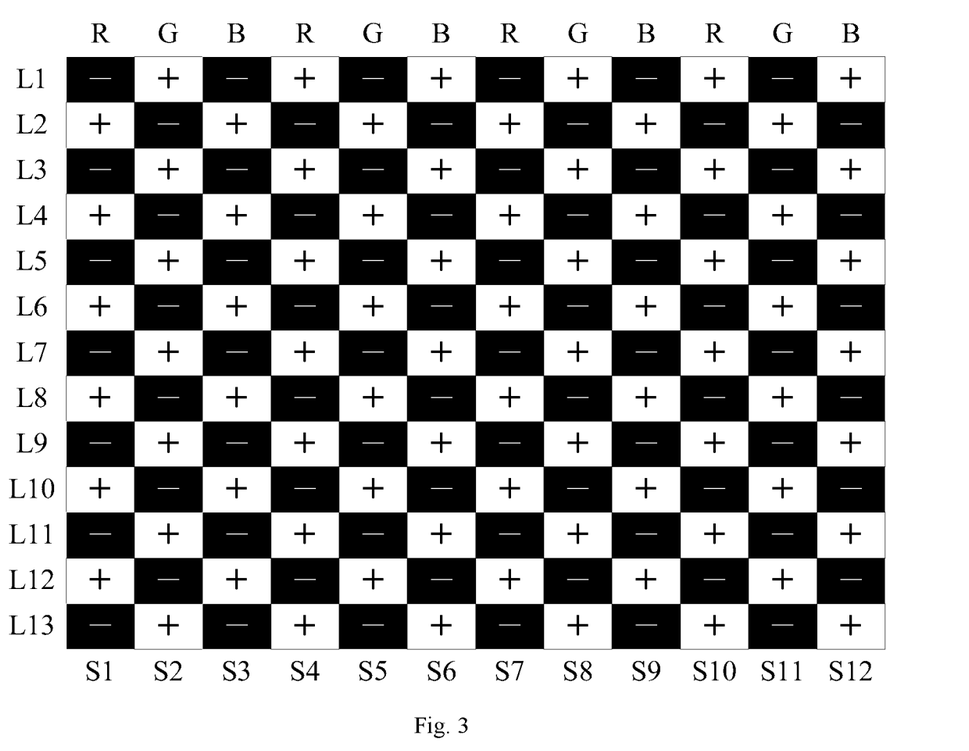
FIG. 3 is a schematic diagram of data parameters when a display panel displays a high power consumption image.

A black image and a 1dot 255 image are taken as an example. As shown in FIG. 2, which is a data parameter corresponding to the black image. Polarity of the data signal applied to the same column of sub-pixels is negative, a gray scale of the same column of sub-pixels is 0, and the gray scales of the adjacent pixels in the same column of sub-pixels are the same. When the same column of sub-pixels is driven, the polarity and gray scale of the data signal do not need to be changed, so the power consumption is minimal. FIG. 3 shows the 1dot 255 image. For pixels controlled by one data line, the data signals applied by the two adjacent pixels is switched between negative polarity and positive polarity, the gray scale needs to be changed from 0 to 255, and display of this kind of image will consume much more power than the black image.

Of course, the above only takes the 1dot 255 image as an example to describe the high power consumption image. For different types of liquid crystal display panels, the determined high power consumption images will also be different. Those skilled in the art may determine which images belong to the high power consumption image according to the different types of display panels. For example, it may be determined that images such as 1dot 255, 2Dot 255, and V Line belong to the high power consumption image, which is not specifically limited here.

For the above problem existing in the related art, embodiments of the present disclosure provide a display panel driving method, a drive circuit thereof, and a display device. In order to make the objectives, technical solutions and advantages of the present disclosure clearer, the specific implementations of the display panel driving method, the drive circuit thereof, and the display device provided by the embodiments of the present disclosure will be illustrated in detail below with reference to accompanying drawings. It should be understood that the preferred embodiments described below are only configured to illustrate and explain the present disclosure and not to limit the present disclosure. The embodiments in the present disclosure and features in the embodiments may be mutually combined in the case of no conflict.

Shapes and size of all components in the accompanying drawings do not reflect the true scale, and only intend to illustrate the content of the present disclosure.

Figure 4:
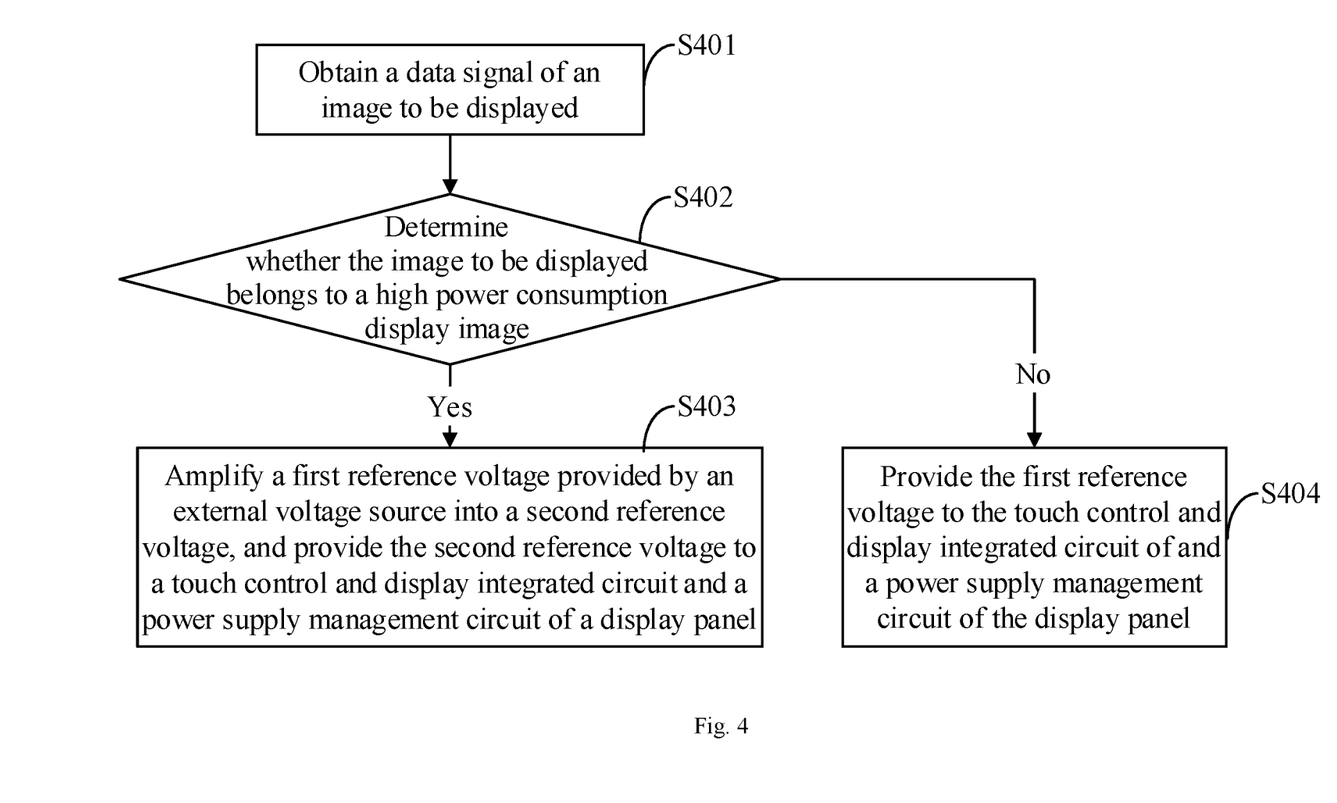
FIG. 4 is a schematic flow diagram of a driving method of a display panel provided by an embodiment of the present disclosure.

A display panel driving method provided by an embodiment of the present disclosure, as shown in FIG. 4, includes the following steps.

Step S401, a data signal of an image to be displayed is obtained. The data signal includes gray scale data corresponding to each pixel, wherein the gray scale data includes a magnitude of a gray scale voltage corresponding to each pixel and positive and negative polarities of the gray scale voltage.

When obtaining the data signal of the image to be displayed, each frame of the display image may be detected, or detection may be performed at intervals of preset frames, which may be set according to actual display requirements, and is not specifically limited here.

Step S402, whether the image to be displayed belongs to a high power consumption display image is determined according to data parameters corresponding to the high power consumption display image set for a display panel and the data signal of the image to be displayed.

Specifically, a situation that the data parameters corresponding to the preset high power consumption display image include data corresponding to a 1dot 255 image is taken as an example for illustration. In the 1dot 255 image, the polarities of the gray scale voltages of the two adjacent pixels driven by the same data line are opposite, that is, one negative and one positive, and the magnitude of the gray scale voltage also changes directly from 0 (black pixel) to 255 (white pixel), or directly change from 255 (white pixel) to 0 (black pixel). That is, the voltage polarity change and voltage magnitude change of gray scale data are both the largest, resulting in that the 1dot 255 image belongs to the high power consumption display image. The data parameters corresponding to the high power consumption display image mentioned in the present disclosure may include the threshold number of the change process of 0-255 or 255-0 loaded by the same data line. That is, if the data signal of the image to be displayed includes more than N of the above change processes, it is considered that the display image belongs to the high power consumption display image. If the data signal of the image to be displayed includes N or less of the above change processes, it is considered that the display image belongs to the low power consumption display image. A value of N may be determined according to the applied display panel, which is not specifically limited here.

The data parameters corresponding to the high power consumption display image are determined according to different types of liquid crystal display panels. Definition of the high power consumption display image may be different for the different types of liquid crystal display panels, which may be determined by those skilled in the art according to the type of the liquid crystal display panels, and is not specifically limited here.

Step S403, when it is determined that the image to be displayed belongs to the high power consumption display image, a first reference voltage provided by an external voltage source is amplified into a second reference voltage, and the second reference voltage is provided to a touch control and display integrated circuit of and a power supply management circuit of the display panel.

Step S404, the first reference voltage is provided to the touch control and display integrated circuit of and the power supply management circuit of the display panel when it is determined that the image to be displayed belongs to the low power consumption display image.

The power supply management circuit is configured to convert the obtained reference voltage signal into a gate on-state voltage VGH of the display panel and a gate off-state voltage VGL of the display panel required by a gate driving circuit of the display panel, and may further convert the obtained reference voltage signal into a source and positive electrode analog voltage AVDDP of the display panel and a source and negative electrode analog voltage AVDDN of the display panel required by the touch control and display integrated circuit of the display panel.

Specifically, the external voltage source provides the first reference voltage VDD to the display panel. After receiving the VDD voltage, the display panel generates the VGH/VGL/AVDDP/AVDDN voltage required by the display panel through the power supply management circuit, and a VDD voltage is usually in a range of 3.3V±0.3V. When displaying the low power consumption image, a current is small, a voltage actually to an input voltage terminal of the power supply management circuit is within the range, other generated voltages are also within the required voltage range of the display panel, and the display image is normal. When displaying the high power consumption image, the current is large, the voltage actually to the input voltage terminal of the power supply management circuit may be less than 3V, that is, less than a minimum value of a power supply voltage required by the power supply management circuit, and thus the VGH/VGL/AVDDP/AVDDN voltage converted by the power supply management circuit under the power supply voltage may also exceed the voltage range required by the corresponding circuit of the display panel, resulting in abnormal display, blank screen or abnormal image.

It can be known from the above that under the high power consumption image, if a power supply voltage structure of the external voltage source is not changed, an input voltage needs to be amplified in the panel drive circuit. However, directly adding a voltage amplifying circuit may cause the input voltage to be greater than 3.6V during the low power consumption image, that is, exceeding a maximum value of the input voltage, and the display panel may also have a possibility of abnormal image.

Therefore, by determining whether the image to be displayed belongs to the high power consumption display image, the present disclosure determines whether to amplify the first reference voltage provided by the external voltage source to obtain the second reference voltage to provide the second reference voltage to the touch control and display integrated circuit and power supply management circuit of the display panel to drive each pixel to ensure the normal display of the high power consumption display image. That is, by determining the power consumption type of the image to be displayed, the present disclosure provides reference voltages of different voltage intensities according to the images to be displayed of different power consumptions, so as to ensure that display images of different power consumptions may be normally displayed, thereby improving a display quality of the display panel.

Optionally, in the display panel driving method provided by the embodiment of the present disclosure, the determining whether the image to be displayed belongs to the high power consumption display image according to the data parameters corresponding to the high power consumption display image set for the display panel and the data signal of the image to be displayed may specifically include the following.

Whether the data signal of the image to be displayed includes data parameters corresponding to the high power consumption display image is determined according to the data parameters corresponding to the high power consumption display image and the data signal of the image to be displayed.

Whether a proportion of data parameters corresponding to the high power consumption display image in the data signal of the image to be displayed is greater than a preset value is determined when it is determined that the data signal of the image to be displayed includes the data parameters corresponding to the high power consumption display image.

It is determined that the image to be displayed belongs to the high power consumption display image when the proportion is greater than the preset value. It is determined that the image to be displayed belongs to the low power consumption display image when it is determined that the data signal of the image to be displayed does not include data parameters corresponding to the high power consumption display image, or when it is determined that the proportion of the data parameters corresponding to the high power consumption display image in the data signal of the image to be displayed is smaller than the preset value.

Specifically, in the display panel driving method provided by the embodiment of the present disclosure, it may be determined whether the image to be displayed belongs to the high power consumption display image by determining whether the data signal of the image to be displayed includes the data parameters corresponding to the high power consumption display image, and by determining the proportion of data parameters corresponding to the high power consumption display image in the data signal of the image to be displayed to the data signal of the image to be displayed. That is, whether the image to be displayed belongs to the high power consumption display image is determined by determining overall power consumption of the image to be displayed.

For example, although the data signal of the image to be displayed includes data parameters corresponding to the high power consumption display image, the data parameters corresponding to the high power consumption display image account for a small proportion of the data signal of the image to be displayed, indicating that when the image to be displayed is displayed, the required power consumption is not large, therefore, the image to be displayed may be determined to not belong to the high power consumption display image.

It should be noted that the low power consumption display image is relative to the high power consumption image, and the low power consumption image includes not only a display image with power consumption lower than the normal level, but also a display image with normal power consumption. That is, the image to be displayed is either the high power consumption display image or the low power consumption display image.

In order to distinguish the proportion of the data parameters set for the high power consumption display image and the low power consumption display image in the data signal of the image to be displayed, that is, the preset value may be set according to actual display needs, and may be set to belong to be more than 50%. Of course, the preset value may also be other proportions, which is not specifically limited here.

Optionally, the display panel driving method provided by the embodiment of the present disclosure may further include: the power supply management circuit processes the received first reference voltage or second reference voltage, and provides the processed voltage to the touch control and display integrated circuit and a gate driving circuit respectively.

Specifically, in the display panel driving method provided by the embodiment of the present disclosure, the main function of the power supply management circuit is to convert the voltage obtained by the power supply management circuit, and provide the voltage to the touch control and display integrated circuit and the gate driving circuit, so as to realize normal driving of the display panel. For example, the VDD voltage may be converted to the VGH/VGL/AVDDP/AVDDN voltage. That is, the power supply management circuit obtains the gate on-state voltage of the display panel, the gate off-state voltage of the display panel, the source and positive electrode analog voltage of the display panel and the source and negative electrode analog voltage of the display panel according to the received first reference voltage or second reference voltage, provides the gate on-state voltage of the display panel and the gate off-state voltage of the display panel to the gate driving circuit, and provides the source and positive electrode analog voltage of the display panel and the source and negative electrode analog voltage of the display panel to the touch control and display integrated circuit.

Figure 5:
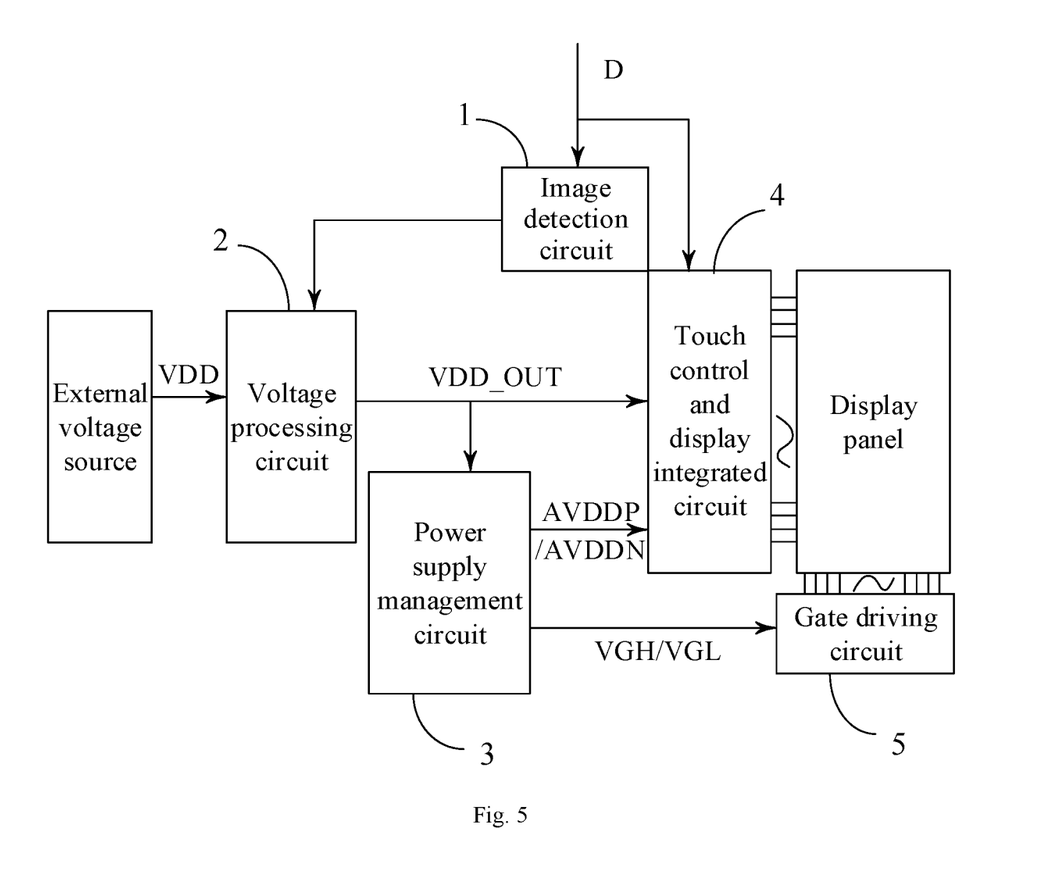
FIG. 5 is a schematic diagram of a circuit structure of a drive circuit of a display panel provided by an embodiment of the present disclosure.

Based on the same inventive concept, an embodiment of the present disclosure further provides a drive circuit of a display panel, as shown in FIG. 5, including: an image detection circuit 1, a voltage processing circuit 2, a power supply management circuit 3, a touch control and display integrated circuit 4 and a gate driving circuit 5.

The image detection circuit 1 is configured to obtain a data signal of an image to be displayed, determine whether the image to be displayed belongs to a high power consumption display image according to data parameters corresponding to the high power consumption display image set for the display panel and the data signal of the image to be displayed, provide a first control signal to the voltage processing circuit 2 when it is determined that the image to be displayed belongs to the high power consumption display image, and provide a second control signal to the voltage processing circuit 2 when it is determined that the image to be displayed belongs to a low power consumption display image.

The voltage processing circuit 2 is configured to receive a first reference voltage VDD provided by an external voltage source, convert the first reference voltage to a second reference voltage and provide the second reference voltage to the power supply management circuit 3 and the touch control and display integrated circuit 4 when receiving the first control signal, and provide the first reference voltage to the power supply management circuit 3 and the touch control and display integrated circuit 4 when receiving the second control signal, wherein the second reference voltage is greater than the first reference voltage.

The power supply management circuit 3 is configured to receive the first reference voltage or the second reference voltage provided by the voltage processing circuit 2, process the first reference voltage or the second reference voltage, and then provide the processed voltage to the touch control and display integrated circuit 4 and the gate driving circuit 5 respectively.

Specifically, in the drive circuit of the display panel provided by the embodiment of the present disclosure, a power consumption type of the image to be displayed may be determined through setting of the image detection circuit, that is, whether the image to be displayed belongs to the high power consumption display image or the low power consumption display image is determined. When the image to be displayed belongs to the high power consumption display image, the first control signal is provided to the voltage processing circuit, so that the voltage processing circuit outputs the amplified second reference voltage; and when the image to be displayed belongs to the low power consumption display image, the second control signal is provided to the voltage processing circuit, and the first reference voltage is outputted directly, so as to meet the demand for a power supply voltage when displaying display images with different power consumptions.

Optionally, in the drive circuit of the display panel provided by the embodiment of the present disclosure, the image detection circuit includes: a preset image detection sub-circuit and a display image determination sub-circuit.

The preset image detection sub-circuit is configured to determine whether the data signal of the image to be displayed includes the data parameters corresponding to the high power consumption display image according to the data parameters corresponding to the high power consumption display image and the data signal of the image to be displayed.

The display image determination sub-circuit is configured to determine whether a proportion of data parameters corresponding to the high power consumption display image in the data signal of the image to be displayed is greater than a preset value when it is determined that the data signal of the image to be displayed includes the data parameters corresponding to the high power consumption display image, and determine that the image to be displayed belongs to the high power consumption display image when the proportion is greater than the preset value.

It is determined that the image to be displayed belongs to the low power consumption display image when it is determined that the data signal of the image to be displayed does not include the data parameters corresponding to the high power consumption display image, or when it is determined that the proportion of the data parameters corresponding to the high power consumption display image in the data signal of the image to be displayed is smaller than the preset value.

Optionally, in the drive circuit of the display panel provided by the embodiment of the present disclosure, the preset value may be greater than 50%.

Figure 6:
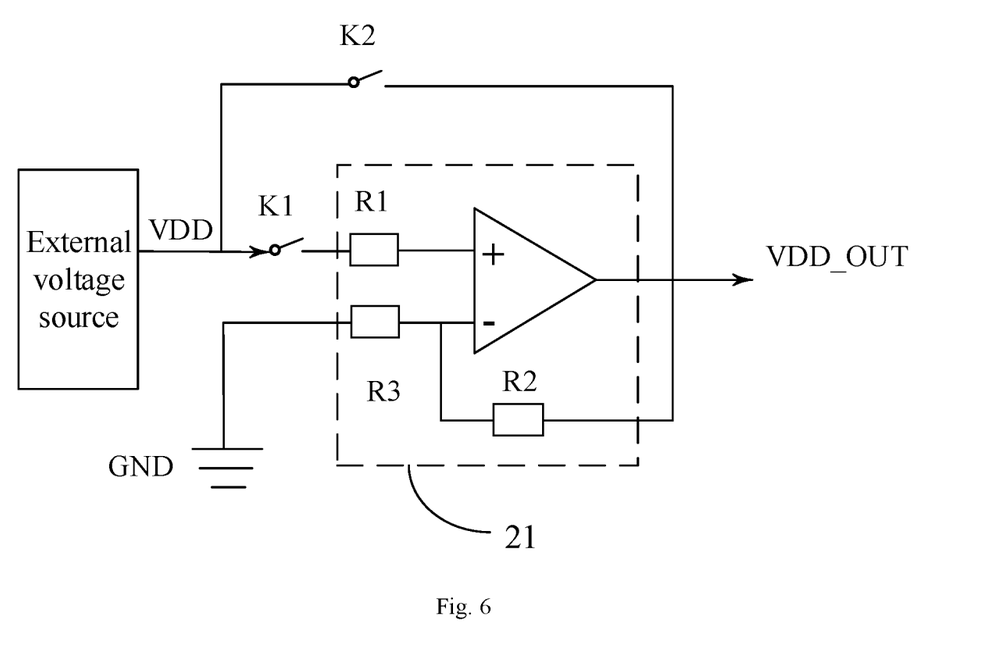
FIG. 6 is a schematic diagram of a circuit structure of a voltage processing circuit provided by an embodiment of the present disclosure.

Optionally, in the drive circuit of the display panel provided by the embodiment of the present disclosure, as shown in FIG. 6, the voltage processing circuit includes: a first switch control sub-circuit K1, a second switch control sub-circuit K3 and an amplifying sub-circuit 21.

An input of the first switch control sub-circuit K1 is electrically connected to the external voltage source, and an output VDD_OUT of the first switch control sub-circuit K1 is electrically connected to the power supply management circuit 3 and the touch control and display integrated circuit 4 respectively; and the first switch control sub-circuit K1 is configured to be turned off under control of the first control signal, and be turned on under control of the second control signal.

An input of the second switch control sub-circuit K2 is electrically connected to the external voltage source, an output of the second switch control sub-circuit K2 is electrically connected to an input of the amplifying sub-circuit 21, and an output VDD_OUT of the amplifying sub-circuit 21 is electrically to the power supply management circuit 3 and the touch control and display integrated circuit 4 respectively. The second switch control sub-circuit 2 is configured to be turned on under the control of the first control signal, and be turned off under the control of the second control signal.

The amplifying sub-circuit 21 is configured to receive the first reference voltage when the second switch control sub-circuit K2 is turned on, amplify the first reference voltage, and provide the amplified second reference voltage to the power supply management circuit 3 and the touch control and display integrated circuit 4 respectively.

The first reference voltage provided by the external voltage source is VDD, and K1 and K2 are analog switches and are controlled by the image detection circuit. When K2 is turned on and K1 is turned off, the voltage VDD_OUT input to the power supply management circuit is equal to VDD; and when K2 is turned off and K1 is turned on, the amplifying sub-circuit starts to work, and the voltage VDD_OUT input to the power supply management circuit is equal to (1+R2/R3)*VDD, and magnification is determined by resistance values of R2 and R3.

The specific implementation method is as follows: initial values of K1 and K2 may be set as K1 being turned off and K2 being turned on, that is, the amplifying sub-circuit does not work initially. When the image detection circuit detects the high power consumption display image, the image detection circuit controls K1 to be turned on and controls K2 to be turned off to amplify the voltage VDD. The magnification may be determined by debugging. The image detection circuit continues to detect the image once every N frames. When the high power consumption image is no longer displayed, K1 is immediately turned off and K2 is immediately turned on, so that the amplifying sub-circuit stops working, and this cycle is repeated.

A structure of the amplifying sub-circuit shown in FIG. 6 is only used as an example, and is not only limited to this structure. Any other circuit structure capable of realizing the voltage amplification function falls within the protection scope of the present disclosure, which is not specifically limited here.

Optionally, in the drive circuit of the display panel provided by the embodiment of the present disclosure, the power supply management circuit includes: a first voltage conversion sub-circuit and a second voltage conversion sub-circuit.

The first voltage conversion sub-circuit is configured to convert the first reference voltage or the second reference voltage, and provide an obtained source and positive electrode analog voltage of the display panel and an obtained source and negative electrode analog voltage of the display panel to the touch control and display integrated circuit.

The second voltage conversion sub-circuit is configured to convert the first reference voltage or the second reference voltage, and provide an obtained gate on-state voltage of the display panel and an obtained gate off-state voltage of the display panel to the gate driving circuit.

It should be noted that the drive circuit of the display panel provided by the embodiment of the present disclosure has all the advantages of the display panel driving method provided by the above embodiments, wherein functions of all the sub-circuits and generated beneficial effects have been illustrated in detail in the driving method, which is not repeated here.

Based on the same inventive concept, an embodiment of the present disclosure further provides a display device, including the drive circuit provided by any above embodiment, and a liquid crystal display panel electrically connected to the drive circuit.

The display device may be: any product or component with a display function, such as a mobile phone, a tablet computer, a television, a displayer, a notebook computer, a digital photo frame, and a navigator. It should be understood by a person of ordinary skill in the art that the display device should have other essential constituent parts, which is not repeated here and should not be regarded as limitation to the present disclosure. Implementation of the display device may refer to embodiments of the above display panel, and repetitions are omitted.

The embodiments of the present disclosure provide the display panel driving method, the drive circuit thereof, and the display device. The driving method includes: whether the image to be displayed belongs to the high power consumption display image is obtained; when it is determined that the image to be displayed belongs to the high power consumption display image, the second reference voltage that is amplified by the first reference voltage and that is provided by the external voltage source is provided to the touch control and display integrated circuit and power supply management circuit of the display panel, and each pixel is driven to ensure the normal display of the high power consumption display image; and when it is determined that the image to be displayed belongs to the low power consumption display image, the first reference voltage is directly provided to the touch control and display integrated circuit and power supply management circuit of the display panel, and each pixel within the display panel is driven so as to ensure the normal display of the low power consumption image. That is, by determining the power consumption type of the image to be displayed, the present disclosure provides the reference voltages of the different voltage intensities according to the images to be displayed of different power consumptions, so as to ensure that the display images of the different power consumptions can be normally displayed, thereby improving the display quality of the display panel.

Obviously, those skilled in the art can make various modifications and variations to the present disclosure without departing from the spirit and scope of the present disclosure. In this way, if these modifications and variations of the present disclosure fall within the scope of the claims of the present disclosure and their equivalent art, the present disclosure also intends to include these modifications and variations.

What is claimed is:

1. A display panel driving method, comprising:
obtaining a data signal of an image to be displayed;
determining whether the image to be displayed belongs to a high power consumption display image according to data parameters corresponding to the high power consumption display image set for a display panel and the data signal of the image to be displayed;
in a condition that it is determined that the image to be displayed belongs to the high power consumption display image, amplifying a first reference voltage provided by an external voltage source into a second reference voltage, and providing the second reference voltage to a touch control and display integrated circuit and a power supply management circuit of the display panel; and
in a condition that it is determined that the image to be displayed belongs to a low power consumption display image, providing the first reference voltage to the touch control and display integrated circuit and the power supply management circuit of the display panel.

2. The driving method according to claim 1, wherein the determining whether the image to be displayed belongs to the high power consumption display image according to the data parameters corresponding to the high power consumption display image set for the display panel and the data signal of the image to be displayed specifically comprises:
determining whether the data signal of the image to be displayed comprises data parameters corresponding to the high power consumption display image according to the data parameters corresponding to the high power consumption display image and the data signal of the image to be displayed;
determining whether a proportion of data parameters corresponding to the high power consumption display image in the data signal of the image to be displayed is greater than a preset value in a condition that it is determined that the data signal of the image to be displayed comprises the data parameters corresponding to the high power consumption display image; and
determining that the image to be displayed belongs to the high power consumption display image in a condition that the proportion is greater than the preset value.

3. The driving method according to claim 2, wherein the determining whether the image to be displayed belongs to the high power consumption display image according to the data parameters corresponding to the high power consumption display image set for the display panel and the data signal of the image to be displayed further comprises:
determining that the image to be displayed belongs to the low power consumption display image in a condition that it is determined that the data signal of the image to be displayed does not comprise data parameters corresponding to the high power consumption display image, or in a condition that it is determined that the proportion of the data parameters corresponding to the high power consumption display image in the data signal of the image to be displayed is smaller than the preset value.

4. The driving method according to claim 3, wherein the preset value is greater than 50%.

5. The driving method according to claim 4, further comprising:
processing, by the power supply management circuit, the received first reference voltage or second reference voltage, and providing a processed voltage to the touch control and display integrated circuit and a gate driving circuit respectively.

6. The driving method according to claim 3, further comprising:
processing, by the power supply management circuit, the received first reference voltage or second reference voltage, and providing a processed voltage to the touch control and display integrated circuit and a gate driving circuit respectively.

7. The driving method according to claim 2, further comprising:
processing, by the power supply management circuit, the received first reference voltage or second reference voltage, and providing a processed voltage to the touch control and display integrated circuit and a gate driving circuit respectively.

8. The driving method according to claim 1, further comprising:
processing, by the power supply management circuit, the received first reference voltage or second reference voltage, and providing a processed voltage to the touch control and display integrated circuit and a gate driving circuit respectively.

9. The driving method according to claim 8, wherein the processing, by the power supply management circuit, the received first reference voltage or second reference voltage, and the providing the processed voltage to the touch control and display integrated circuit and the gate driving circuit respectively, comprises:
obtaining, by the power supply management circuit, a gate on-state voltage of the display panel, a gate off-state voltage of the display panel, a source and positive electrode analog voltage of the display panel and a source and negative electrode analog voltage of the display panel according to the received first reference voltage or the second reference voltage, providing the gate on-state voltage of the display panel and the gate off-state voltage of the display panel to the gate driving circuit, and providing the source and positive electrode analog voltage of the display panel and the source and negative electrode analog voltage of the display panel to the touch control and display integrated circuit.

10. A drive circuit of a display panel, comprising: a voltage processing circuit, an image detection circuit, a power supply management circuit, a touch control and display integrated circuit and a gate driving circuit, wherein:
the image detection circuit is configured to obtain a data signal of an image to be displayed, determine whether the image to be displayed belongs to a high power consumption display image according to data parameters corresponding to the high power consumption display image set for the display panel and the data signal of the image to be displayed, provide a first control signal to the voltage processing circuit in a condition that it is determined that the image to be displayed belongs to the high power consumption display image, and provide a second control signal to the voltage processing circuit in a condition that it is determined that the image to be displayed belongs to a low power consumption display image;

the voltage processing circuit is configured to receive a first reference voltage provided by an external voltage source, convert the first reference voltage to a second reference voltage and provide the second reference voltage to the power supply management circuit and the touch control and display integrated circuit in response to receiving the first control signal; and provide the first reference voltage to the power supply management circuit and the touch control and display integrated circuit in response to receiving the second control signal, wherein the second reference voltage is greater than the first reference voltage; and the power supply management circuit is configured to receive the first reference voltage or the second reference voltage provided by the voltage processing circuit, process the first reference voltage or the second reference voltage, and provide a processed voltage to the touch control and display integrated circuit and the gate driving circuit respectively.

11. The drive circuit according to claim 10, wherein the image detection circuit comprises: a preset image detection sub-circuit and a display image determination sub-circuit;

the preset image detection sub-circuit is configured to determine whether the data signal of the image to be displayed comprises the data parameters corresponding to the high power consumption display image according to the data parameters corresponding to the high power consumption display image and the data signal of the image to be displayed; and the display image determination sub-circuit is configured to determine whether a proportion of data parameters corresponding to the high power consumption display image in the data signal of the image to be displayed is greater than a preset value in a condition that it is determined that the data signal of the image to be displayed comprises the data parameters corresponding to the high power consumption display image, and determine that the image to be displayed belongs to the high power consumption display image in a condition that the proportion is greater than the preset value.

12. The drive circuit according to claim 11, wherein the preset value is greater than 50%.

13. The drive circuit according to claim 12, wherein the power supply management circuit comprises: a first voltage conversion sub-circuit and a second voltage conversion sub-circuit;

the first voltage conversion sub-circuit is configured to convert the first reference voltage or the second reference voltage, and provide an obtained source and positive electrode analog voltage of the display panel and an obtained source and negative electrode analog voltage of the display panel to the touch control and display integrated circuit; and the second voltage conversion sub-circuit is configured to convert the first reference voltage or the second reference voltage, and provide an obtained gate on-state voltage of the display panel and an obtained gate off-state voltage of the display panel to the gate driving circuit.

14. The drive circuit according to claim 11, wherein:

the display image determination sub-circuit is further configured to determine that the image to be displayed belongs to the low power consumption display image in a condition that it is determined that the data signal of the image to be displayed does not comprise data parameters corresponding to the high power consumption display image, or in a condition that it is determined that the proportion of the data parameters corresponding to the high power consumption display image in the data signal of the image to be displayed is smaller than the preset value.

15. The drive circuit according to claim 11, wherein the power supply management circuit comprises: a first voltage conversion sub-circuit and a second voltage conversion sub-circuit;

the first voltage conversion sub-circuit is configured to convert the first reference voltage or the second reference voltage, and provide an obtained source and positive electrode analog voltage of the display panel and an obtained source and negative electrode analog voltage of the display panel to the touch control and display integrated circuit; and the second voltage conversion sub-circuit is configured to convert the first reference voltage or the second reference voltage, and provide an obtained gate on-state voltage of the display panel and an obtained gate off-state voltage of the display panel to the gate driving circuit.

16. The drive circuit according to claim 10, wherein the voltage processing circuit comprises: a first switch control sub-circuit, a second switch control sub-circuit and an amplifying sub-circuit;

an input of the first switch control sub-circuit is electrically connected to the external voltage source, and an output of the first switch control sub-circuit is electrically connected to the power supply management circuit and the touch control and display integrated circuit respectively; and the first switch control sub-circuit is configured to be turned off under control of the first control signal, and be turned on under control of the second control signal;

an input of the second switch control sub-circuit is electrically connected to the external voltage source, an output of the second switch control sub-circuit is electrically connected to an input of the amplifying sub-circuit, and an output of the amplifying sub-circuit is electrically to the power supply management circuit and the touch control and display integrated circuit respectively; and the second switch control sub-circuit is configured to be turned on under the control of the first control signal, and be turned off under the control of the second control signal; and the amplifying sub-circuit is configured to receive the first reference voltage in a condition that the second switch control sub-circuit is turned on, amplify the first reference voltage to obtain the second reference voltage, and provide the second reference voltage to the power supply management circuit and the touch control and display integrated circuit respectively.

17. The drive circuit according to claim 10, wherein the power supply management circuit comprises: a first voltage conversion sub-circuit and a second voltage conversion sub-circuit;

the first voltage conversion sub-circuit is configured to convert the first reference voltage or the second reference voltage, and provide an obtained source and positive electrode analog voltage of the display panel and an obtained source and negative electrode analog voltage of the display panel to the touch control and display integrated circuit; and the second voltage conversion sub-circuit is configured to convert the first reference voltage or the second reference voltage, and provide an obtained gate on-state voltage of the display panel and an obtained gate off-state voltage of the display panel to the gate driving circuit.

18. A display device, comprising the drive circuit according to claim 10, and a liquid crystal display panel electrically connected to the drive circuit.

\* \* \* \* \*